US009059981B2

(12) United States Patent
Cadden et al.

(10) Patent No.: US 9,059,981 B2
(45) Date of Patent: Jun. 16, 2015

(54) SYSTEM, METHOD, AND COMPUTER PROGRAM PRODUCT FOR SECURITY VERIFICATION OF COMMUNICATIONS TO TENANTS OF AN ON-DEMAND DATABASE SERVICE

(71) Applicant: salesforce.com, inc, San Francisco, CA (US)

(72) Inventors: Michael P. Cadden, Lutz, FL (US); Richard Alan Stevens, Odessa, FL (US); Ron H. Kimble, Lutz, FL (US); Rasmus Mencke, San Francisco, CA (US); Travis D. Corson, Tampa, FL (US); Susan Shanabrook, Safety Harbor, FL (US)

(73) Assignee: salesforce.com, inc., San Francisco, CA (US)

(*) Notice: Subject to any disclaimer, the term of this patent is extended or adjusted under 35 U.S.C. 154(b) by 123 days.

(21) Appl. No.: 13/797,828

(22) Filed: Mar. 12, 2013

(65) Prior Publication Data
US 2013/0191892 A1 Jul. 25, 2013

Related U.S. Application Data

(63) Continuation of application No. 12/357,999, filed on Jan. 22, 2009, now Pat. No. 8,677,470.

(60) Provisional application No. 61/022,748, filed on Jan. 22, 2008.

(51) Int. Cl.
*H04L 29/06* (2006.01)
*G06F 21/00* (2013.01)
*H04L 9/00* (2006.01)
*H04L 9/32* (2006.01)

(52) U.S. Cl.
CPC ........ *H04L 63/08* (2013.01); *H04L 9/32* (2013.01); *H04L 63/12* (2013.01)

(58) Field of Classification Search
CPC ............ H04L 63/12; H04L 63/08; H04L 9/32
USPC ................. 726/5, 4, 11, 21, 26; 709/206, 224
See application file for complete search history.

(56) References Cited

U.S. PATENT DOCUMENTS

| 5,577,188 | A | 11/1996 | Zhu |
| 5,608,872 | A | 3/1997 | Schwartz et al. |

(Continued)

FOREIGN PATENT DOCUMENTS

WO    WO 2010145160 A1 * 12/2010

OTHER PUBLICATIONS

Bertram, S.; Boniface, M.; Surridge, M.; Briscombe, N.; Hall-May, M.; "On-Demand Dynamic Security for Risk-Based Secure Collaboration in Clouds"; Cloud Computing (CLOUD), 2010 IEEE 3rd International Conference on DOI: 10.1109/CLOUD.2010.83; Publication Year: Mar. 2010; pp. 518-525.*

(Continued)

*Primary Examiner* — Andrew Nalven
*Assistant Examiner* — Courtney Fields
(74) *Attorney, Agent, or Firm* — Zilka-Kotab, PC

(57) ABSTRACT

In accordance with embodiments, there are provided mechanisms and methods for security verification of communications to tenants of an on-demand database service. These mechanisms and methods for security verification of communications to tenants of an on-demand database service can enable embodiments to allow tenants to selectively implement security measures with respect to inbound communications, etc. The ability of embodiments to provide such feature may allow tenants to efficiently and effectively implement security measures for in-bound emails.

8 Claims, 5 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 8,781,988 B1 | 7/2014 | Shanabrook et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0132060 A1 | 6/2005 | Mo et al. |
| 2005/0223022 A1 | 10/2005 | Weissman et al. |
| 2006/0021019 A1 | 1/2006 | Hinton et al. |
| 2008/0005786 A1* | 1/2008 | Dreymann ............ 726/4 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0271349 A1* | 11/2011 | Kaplan ............ 726/26 |
| 2013/0198869 A1 | 8/2013 | Shanabrook et al. |
| 2013/0198870 A1 | 8/2013 | Shanabrook et al. |
| 2013/0198871 A1 | 8/2013 | Shanabrook et al. |
| 2013/0218948 A1 | 8/2013 | Jakobson |
| 2013/0218949 A1 | 8/2013 | Jakobson |
| 2013/0218966 A1 | 8/2013 | Jakobson |

OTHER PUBLICATIONS

Notice of Allowance from U.S. Appl. No. 12/175,082, dated Mar. 6, 2014.

* cited by examiner

SYSTEM, METHOD, AND COMPUTER PROGRAM PRODUCT FOR SECURITY VERIFICATION OF COMMUNICATIONS TO TENANTS OF AN ON-DEMAND DATABASE SERVICE

CLAIM OF PRIORITY

This application is a continuation of U.S. application Ser. No. 12/357,999, filed Jan. 22, 2009, which claims the benefit of U.S. Provisional Patent Application No. 61/022,748, filed Jan. 22, 2008, the entire contents of which are incorporated herein by reference.

COPY RIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to on-demand database services, and more particularly to providing security verification of communication to users of such systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to provide security to users of the foregoing database frameworks. For example, communications to users of such systems may present potential security threats to information associated with the user and to information of an organization associated with the user. Thus, it is desirable to implement configurable and effective security measures with respect to these communications.

BRIEF SUMMARY

In accordance with embodiments, there are provided mechanisms and methods for security verification of communications to tenants of an on-demand database service. These mechanisms and methods for security verification of communications to tenants of an on-demand database service can enable embodiments to allow tenants to selectively implement security measures with respect to inbound communications, etc. The ability of embodiments to provide such feature may allow tenants to efficiently and effectively implement security measures for in-bound emails.

In an embodiment and by way of example, a method is provided for security verification of communications to tenants of an on-demand database service. In use, a communication destined to a first tenant of a plurality of tenants using at least one on-demand service is received. Additionally, a plurality of security processes are applied to the communication to obtain at least one return code, the at least one return code being associated with at least one of the plurality of security processes. Furthermore, it is determined, based at least in part on the at least one return code, whether to process the communication.

While the present invention is described with reference to an embodiment in which techniques for security verification of communications to tenants of an on-demand database service are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for security verification of communications to tenants of an on-demand database service.

There is a desire to provide security to users of on-demand database services. For example, communications to users of such services may present potential security threats to information associated with the user and to information of an organization associated with the user. Thus, it is desirable to implement configurable and effective security measures with respect to these communications.

Thus, mechanisms and methods are provided herein for security verification of communications to tenants of an on-demand database service and can enable embodiments to allow tenants to selectively implement security measures with respect to inbound communications, etc. The ability of embodiments to provide such feature may allow tenants to efficiently and effectively implement security measures for in-bound emails.

Next, mechanisms and methods for security verification of communications to tenants of an on-demand database service will be described with reference to exemplary embodiments.

Figure 1:
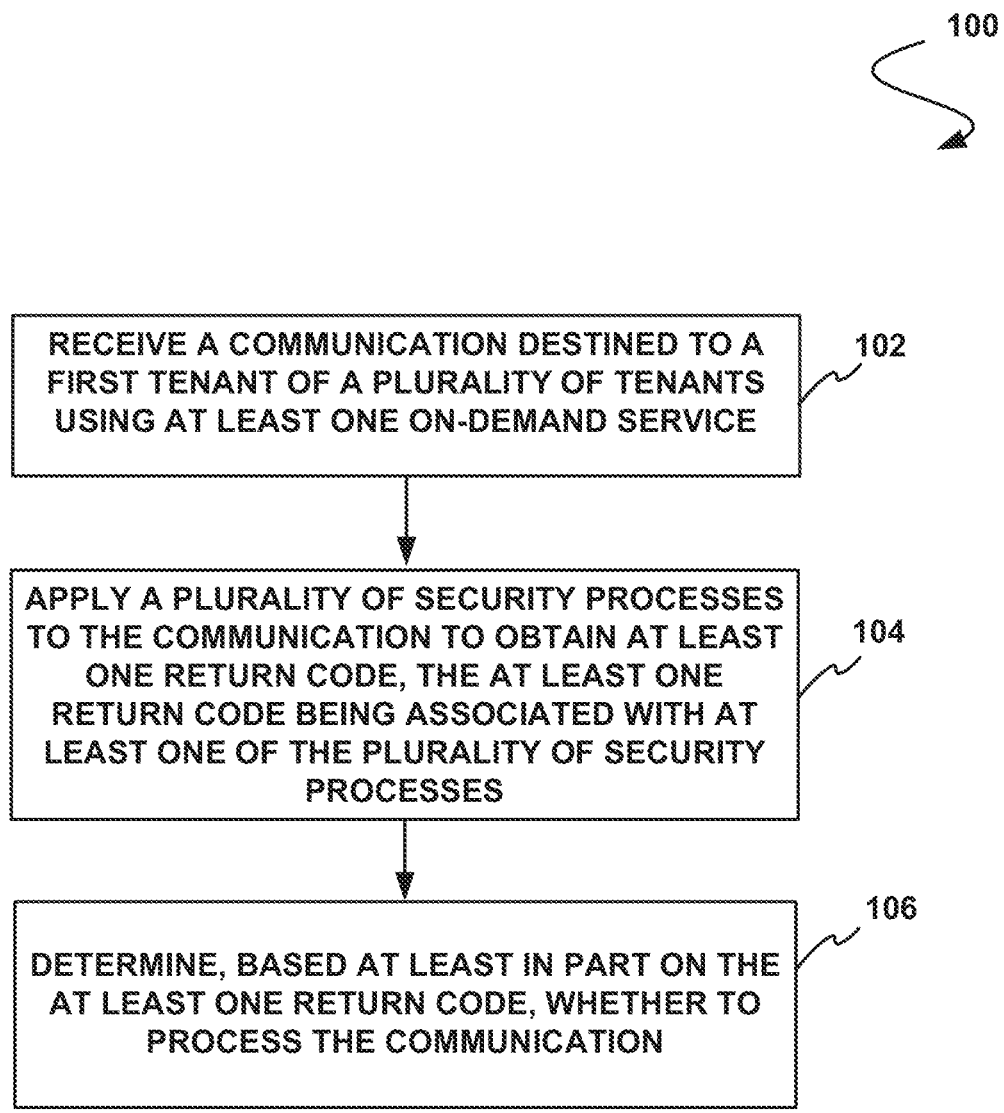
FIG. 1 shows a method for security verification of communications to tenants of an on-demand service, in accordance with one embodiment.

FIG. 1 shows a method 100 for security verification of communications to tenants of an on-demand service, in accordance with one embodiment. As shown, a communication destined to a first tenant of a plurality of tenants using at least one on-demand service is received. See operation 102.

In the context of the present description, an on-demand service refers to any service that is accessible over a network. In one embodiment, the on-demand service may include an on-demand database service, in this case, an on-demand database service may include any service that relies on a database system that is accessible over a network.

In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Additionally, in the context of the present description, a tenant refers to any user of the on-demand service. For example, in various embodiments, the tenants may include customers, subscribers, developers, and any other users of the on-demand service.

Furthermore, it should be noted that, in one embodiment, the communication may include an email destined to the tenant. Once the communication is received, a plurality of security processes are applied to the communication to obtain at least one return code, the at least one return code being associated with at least one of the plurality of security processes. See operation 104.

The plurality of security processes may include any security process capable of being utilized to obtain a return code. For example, in one embodiment, the plurality of security processes may include tests corresponding to at least one security protocol. In various embodiments, the security protocol may include one or more of a sender policy framework (SPF) security protocol, a Sender ID security protocol, a DomainKeys security protocol, and a Domain Keys Identified Mail (DKIM) security protocol. Of course, the security protocol may include any desired security protocol.

In the context of the present description, a return code refers to any code indicative of a result of a security process. For example, in various embodiments, the return code may include a code indicative of a pass, fail, or neutral result of one or more of the security processes.

Once the return code is obtained, it is determined, based at least in part on the return code, whether to process the communication. See operation 106. For example, if the return code indicates a failure, it may be determined that the communication is not to be processed. In this case, a refusal to process the communication may be indicated when the at least one return code indicates security checking fails.

In one embodiment, the return code may indicate a pass when at least one of the plurality of security processes indicates a pass. Additionally, the return code may indicate a pass when none of the plurality of security processes indicates a failure. Still yet, the return code may indicate a pass when at least one of the plurality of security processes indicates a pass and none of the plurality of security processes indicates a failure. If a pass is indicated, the communication may be processed.

In the context of the present description, processing of the communication may include any processing of the communication. For example, the processing may include allowing the communication to be delivered, routing the communication to a destination, storing the communication, and/or any other processing. In one embodiment, the processing may also include accessing computer code associated with the communication (e.g. based on information in the communication, etc.). In this case, the processing may further include executing the computer code such that the execution processes the communication. This processing may include extracting text from the communication, generating contact information based on the communication, establishing a calendar event based on the communication, and/or any other processing determined by a user.

If it is determined that the communication is not to be processed, the communication may be deleted, directed to a specific location for unprocessed communications, returned to a sender of the communication, or any other action may occur with respect to the communication. In one embodiment, if it is determined that the communication is not to be processed, no action may be taken.

As an option, the return code may be based on a result of combining a plurality of return codes. In this case, determining whether to process the communication may be based at least in part on the result of the combing the plurality of return codes. The combination may be a summary of all of the combined return codes.

In one embodiment, a security preference associated with the first tenant may be determined based at least in part on the communication. For example, it may be determined that the first tenant has a security feature enabled. In this case, the security processes may be implemented with respect to the communication. Additionally, it may be determined that the first tenant has disabled one or more of the security processes. In this case, these security processes may not be implemented with respect to the communication.

In one embodiment, the security preference associated with the first tenant may be determined based at least in part on the communication. In this case, the security preference may be only implemented with respect to certain senders. For example, if the communication is an email, at least a portion of an email address of a sender of the email may be verified. As an option, the portion of the email address of the sender may be verified by comparing the portion of the email address to information in a white list (i.e. a list of permitted senders) or a black list (i.e. a list of blocked senders). In one embodiment, the capability to blacklist may only be available at a system administrator level.

Figure 2:
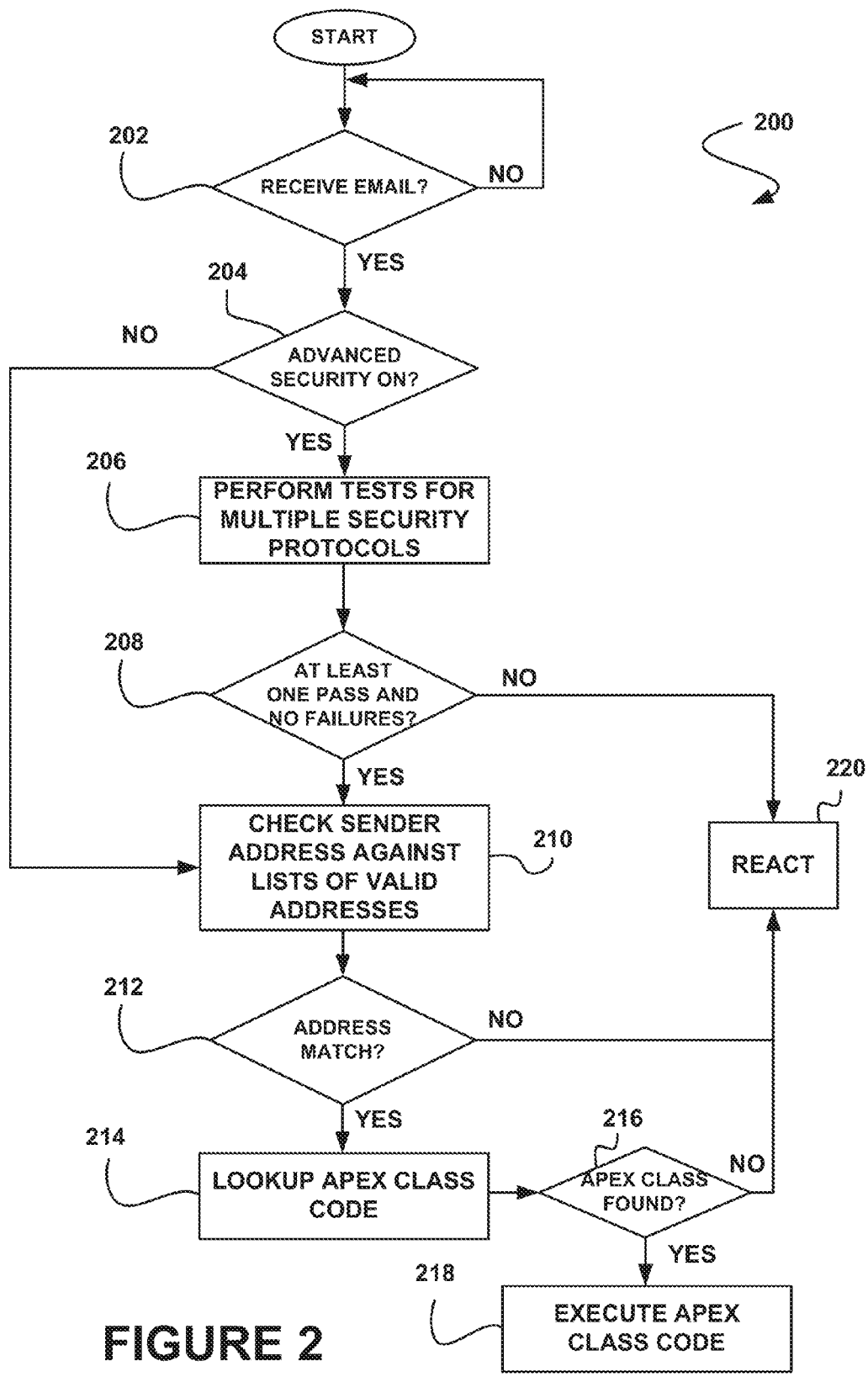
FIG. 2 shows a method for security verification of communications to tenants of an on-demand database service, in accordance with another embodiment.

FIG. 2 shows a method 200 for security verification of communications to tenants of an on-demand database service, in accordance with one embodiment. As an option, the present method 200 may be implemented in the context of the functionality of FIG. 1. Of course, however, the method 200 may be carried out in any desired environment. The aforementioned definitions may apply during the present description.

As shown, it is determined whether an email is received. See operation 202. If an email is received, it is determined whether an advanced security feature is on. See operation 204.

This determination may be based on a user setting. In this context, the "user" means the owner of the service. For example, a tenant of an on-demand database service may have the ability to enable or disable the advanced security feature at the email service level; all of the destination service email addresses associated with this email service then inherit this advanced security preference.

If it is determined that the advanced security feature is on, tests are performed for multiple security protocols. See operation 206. These security protocols may include a variety of security protocols.

The tests are then performed with respect to the communication and a result is produced including a pass indication, a fail indication, or a neutral indication (i.e. neither pass nor fail). This result may be returned as a return code including a pass, fail, or none code.

It is then determined whether the tests result in at least one pass with no failures. See operation 208. If this is the case, a sender email address of the email is checked against a list of known valid email addresses (e.g. a white list, etc.). See operation 210.

In one embodiment, a portion of the email address (e.g. a domain name, etc.) may be compared to a list of valid email addresses or portions thereof. In these cases, the valid email address may be stored in a database associated with the on-demand database service.

Based on this comparison, it is determined if there is a match. See operation 212. If there is a match, a lookup for Apex class code is performed. See operation 214.

In one embodiment, the lookup may be performed utilizing the email address or a portion thereof. It is then determined whether Apex class code is found. See operation 216. If Apex class code is found, the code is retrieved, and the Apex class code is executed. See operation 218. The execution of the Apex class code may perform various functions, based on the context in which the email is received. For example, in various embodiments, the execution of the Apex class code may result in a event creation in a calendar, a contact creation, a contact update, etc.

It should be noted that, if it is determined that, in operation 208, none of the tests associated with the security protocols pass, or that at least one of the tests fail, an action may be implemented. See operation 220. Similarly, if it is determined that the sending email address of the email does not match a known valid email address, in operation 212, an action may also be implemented.

In these cases, the action may include any action such as quarantining the email, returning the email, rejecting the email, deleting the email, etc. In one embodiment, the action may include a user defined action.

In one embodiment, using the techniques described in the context of FIG. 2, a method for applying one-click email security around inbound emails in a multi-tenant environment may be implemented. In this way, a tenant may enable advanced SMTP email security mechanisms such as SPF, SenderId, DomainKeys or DKIM with a simple one-click administrative action. Additionally, the complexity of the security processes may be hidden from the user. This may be useful if the tenant does not understand the underlying email security technologies, the tenant may only need to perform a one-click check to enable the advanced security checking/verification.

Furthermore, the dependency of the user to understand what security protocols are available and supported by the sending email system is removed. Still yet, the email system may not need to change any underlying logic depending on the security protocols available within the sending system. The email system may simply pass the results of any and all security protocols that are supported and utilized by both the sending and receiving email systems into an advanced security algorithm. As a result, the system may be allowed to transparently change the underlying algorithm and to add or remove support for additional security protocols without requiring any changes in a configuration of a tenant.

In one embodiment, when the advanced security feature has been enabled, a processing algorithm may translate the various pass, soft failure, hard failure, and "none" return codes that are applicable to each specific security protocol that is available and supported for a given email connection, into a simple process return code (PRC) of pass/fail/none.

In one embodiment, the resulting inbound email may be processed when the sum of "Fail" return codes is equal to zero (i.e. no failures) and the sum of "Pass" return codes is greater than or equal to one (i.e. at least one security protocol must pass). If the advanced security checking passes, the inbound email may then be processed. If the advanced security checking fails, the inbound email may not be processed and the tenant may optionally be notified. For example, the tenant may be notified via different user defined mechanisms.

In some cases, an organization administrator may be responsible for creating email services that are available for the configuration of email services addresses by either the administrator or other users in the organization associated with the administrator. In various embodiments, an administrator may have the ability to specify different attributes/functionality when creating the email service. The function name may be required as part of creating the email service.

As another option, the administrator may specify an Apex class that implements an inbound messaging email handler interface that will be invoked when an inbound email is received. Additionally, the administrator may specify whether text and/or binary attachments will be passed if received and whether the security function is active. In another embodiment, the administrator may specify a list of domains and/or addresses that may be considered valid senders for the function, whether to bounce, discard, or re-queue the message in the case of exceeding the daily rate limit for the organization, whether to bounce or discard the message if the email address is currently marked inactive by the administrator, whether to bounce or discard the message if the email service is currently marked inactive by the administrator, and whether to bounce or discard the message if the security checks fail.

Once an email service is created, the administrator may create email services addresses associated with the email service. In one embodiment, the administrator may accomplish this using the email service and by choosing a "New Email Address" button. As a result of this selection, the administrator may be presented with another page that allows the administrator to specify whether the address is active or not, and the owner of the address. The owner may be an administrator, a user in an organization of the administrator, or may be a user corresponding to a handler that is implemented when an email is received for this address. Still yet, the administrator may be able to specify a list of domains and/or addresses that may be considered valid senders for the function. This may be used in conjunction with the list specified at a service level.

In one embodiment, an Apex class author may write the Apex code to process the inbound email. For example, the class author may implement a predefined interface to make the class ready for processing inbound emails.

As an option, the organization user may be prohibited to set up or modify anything related to this feature. As another option, an InboundEmail Handler interface may be used rather than exposing WebServices. In some cases, this may be cleaner from a customer point of view because the customer may not know that WebServices is being utilized.

As noted above, security features may be provided to allow for the enforcement of existing protocols, as well as the ability to specify a list of authorized senders. This security may be implemented to ensure that mail may only be received from a specified set of addresses and to ensure that the sender is authentic. As an option, further security may be provided in the encryption of a token in the mail domain.

The security may be configurable by a user and an administrator. Once the security has been defined, it may be enforced in a call from a mail catcher service to an application. If advanced security for the function has been specified to be required, then the results of the protocols may be used to evaluate the email.

An SMTP server may map the results of the checks against these protocols to pass, fail, or none codes. The SMTP server passes these results to a mail catcher server in headers. The mail catcher server then passes the results into a call for processing (e.g. a GetContext call, etc.).

In one embodiment, a "Fail" result from any of these protocols may result in the mail being rejected. Additionally, if at least one "Pass" result is received, the mail may be accepted. In the case of a rejection based on this criteria, an action as specified by a function (e.g. an "AuthenticationFailureAction," etc.) may be taken such that the message may either be bounced with an indication of why the authentication failed, or discarded, etc. The bounce messages for these cases may include any message such as "The {0} check failed," or "No authentication check passed," etc.

As an option, if authorized users have been specified by an organization administrator for the function, or by the user for the specific email address, then the sending user may be validated against those users. A failure to match those users may result in the action (e.g. bounce or discard, etc.) as specified by the respective function configurations (e.g. a "ServiceLevelSenderAuthorizationFailed" function and an "AddressLevelSenderAuthorizationFailed" function, etc.). In this case, the bounce text message may include any message such as "The sender address {0} is not authorized for this service."

Assuming that all of these checks have passed, then a session ID associated with the service owner specified at address creation time, or the creating user if no service owner is specified, may be returned for use by the mail catcher server in invoking the specific function through the web service interface. In addition, an attachment processing specified by the administrator at function creation time may be returned to the mail catcher server and the mail catcher server may remove any attachments that do not match the specified criteria.

In one embodiment, an email rate limiting may also be implemented. In come cases, a mail service rate may be limited separately from an existing API rate limiting. If this is the case, there may be two values related to rate limiting attributed on an organization, an email services rate limit that indicates the current daily limit for inbound email and has a maximum number (e.g. one million, etc.), and an email services rate multiplier that is used to determine the daily limit for inbound email based on a number of licenses in the organization. As an option, this may have a default value (e.g. 1,000, etc.).

In one embodiment, both of these organization values may be editable. The email rate limit may be obtained by examining the organization value "EmailServicesRateLimit." If this value has been manually set in the database then that value may be returned. Otherwise, the default value may be calculated by multiplying the number of active licenses in the organization by the "EmailServicesrRateMultiplier" organization value.

As an option, any mail that exceeds the daily rate limit by default may be bounced to the sender with a message specified in a label file. The text of this label may be "<recipient> cannot receive any more emails today," although the organization may specify that the mail be discarded.

Figure 3:
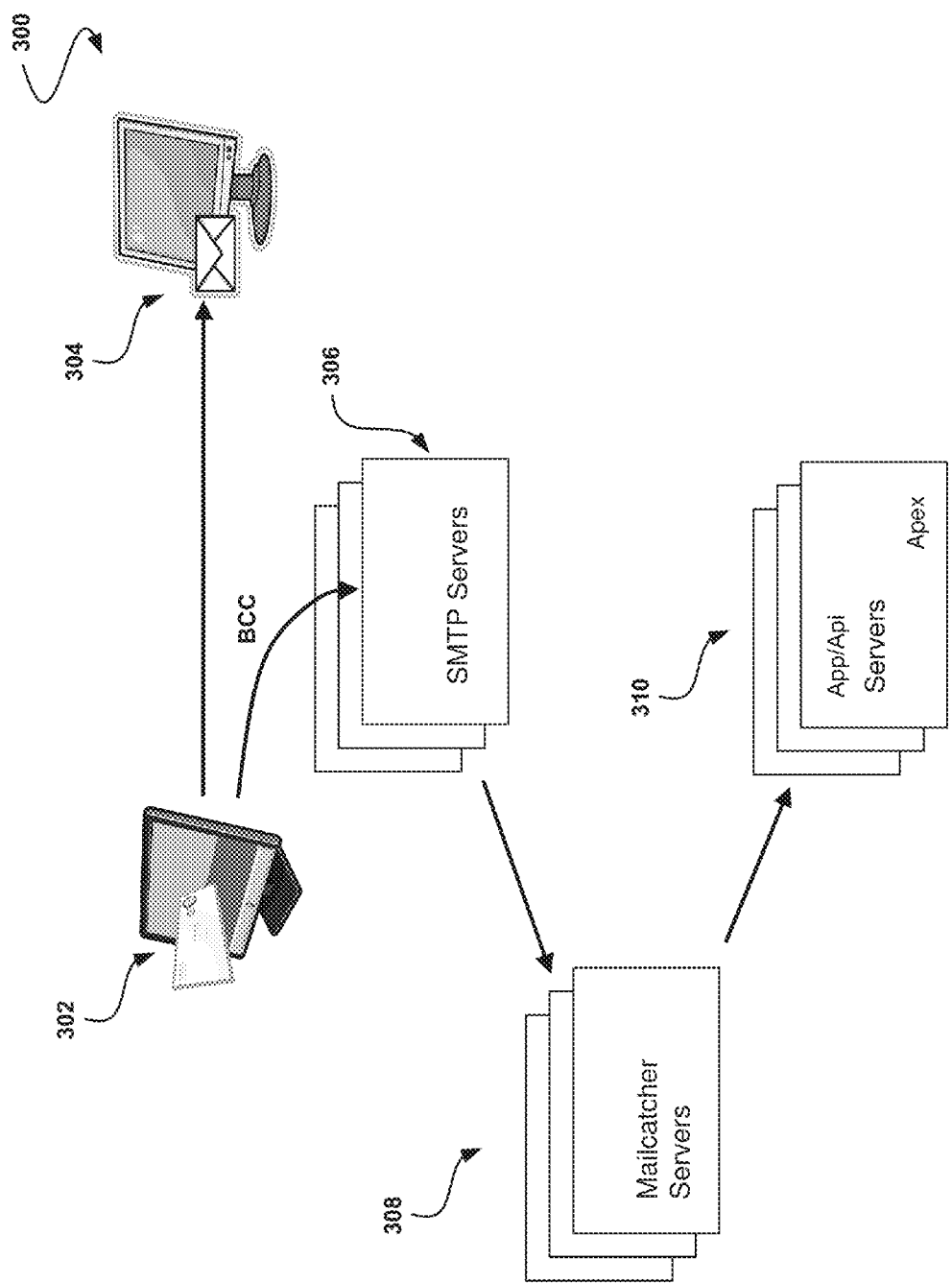
FIG. 3 shows a system flow diagram for security verification of communications to tenants of an on-demand database service, in accordance with one embodiment.

FIG. 3 shows a system flow diagram 300 for security verification of communications to tenants of an on-demand database service, in accordance with one embodiment. As an option, the system flow diagram 300 may be implemented in the context of the functionality of FIGS. 1-2. Of course, however, the system flow diagram 300 may be implemented in any desired environment. Again, the aforementioned definitions may apply during the present description.

As shown, a user 302 sends an email to a contact 304 and blind copies an inbound address associated with a tenant of an on-demand database service. The email then arrives at an SMTP gateway including one or more SMTP servers 306 of the on-demand database service.

Any email with the appropriate domain name is then routed to a mail catcher server 308. At the mail catcher server 308, the destination/service email address is decoded and an instance of the address is looked up for verification purposes. If all of the security checks pass (e.g. advanced security protocol checks, whitelist at the service and destination address levels, etc.), then the mail catcher server 308 sends an SOAP request with email properties to invoke Apex code to an application/API server 310.

The Apex code is then executed to examine the email. As a result of the execution, any contacts/leads are discovered and such contact/leads may be stored. Of course, the execution of the Apex code may result in any number of operations as defined by the developer.

System Overview

Figure 4:
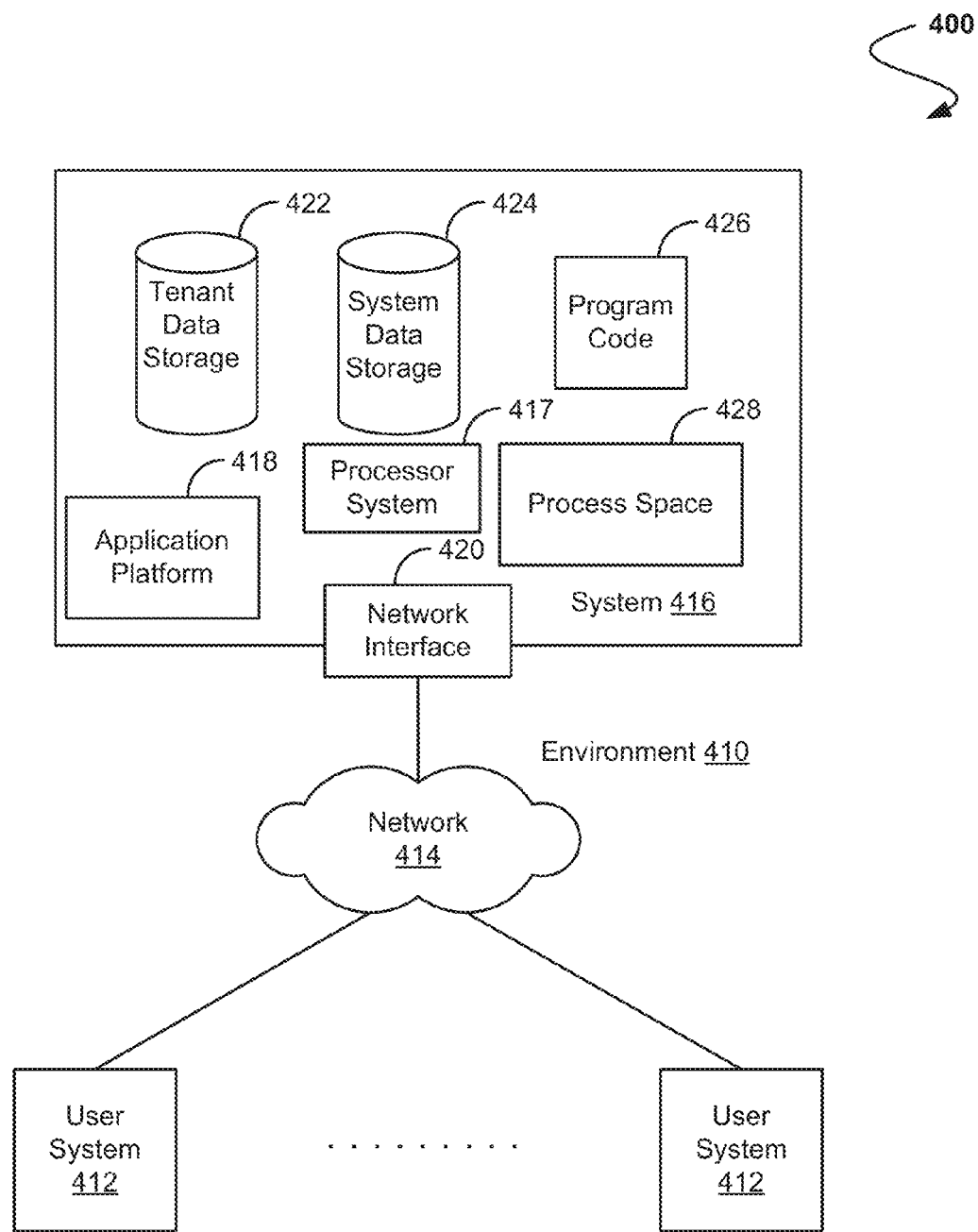
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
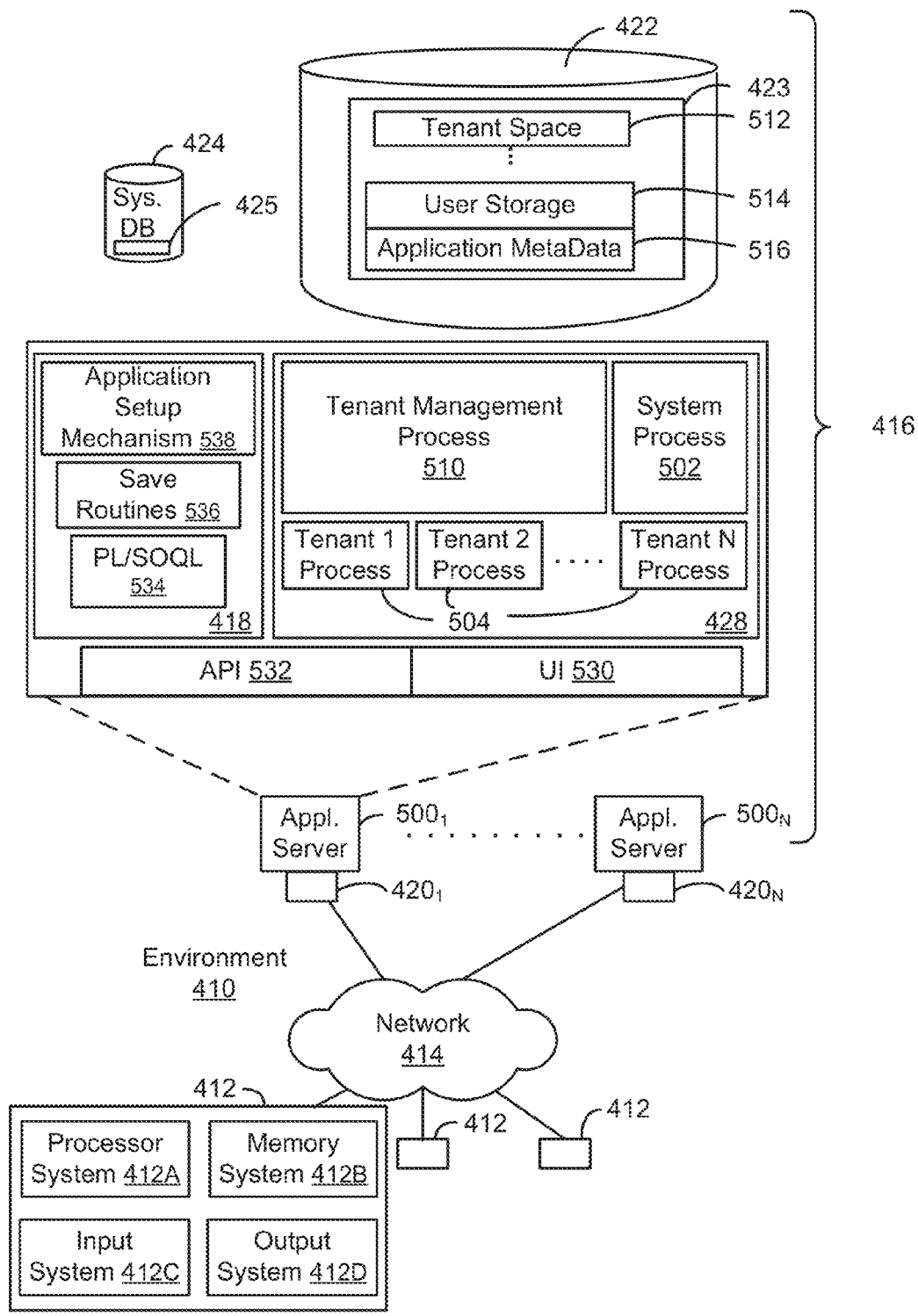
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields, It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in U.S. patent application Ser. No. 12/175,082, titled "SYSTEM, METHOD AND COMPUTER PROGRAM PRODUCT FOR MESSAGING IN AN ON-DEMAND SERVICE," filed Jul. 17, 2008, which is incorporated herein by reference in its entirety for all purposes; or one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR. IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory machine-readable medium storing computer code adapted to be executed by a computer to perform a method comprising:
    receiving, through a service of a system having a processor and a memory, a communication destined to a first user of a plurality of users of the service;
    performing, by the system, security checking of the communication by applying a plurality of security checks to the communication;
    receiving, from each of the plurality of security checks, a code indicative of a result of the security check;
    determining a return code that summarizes the received codes and indicates whether the communication passes the security checking;
    delivering, through the service of the system, the communication to a first location that is a destination of the communication, when the return code indicates that the communication passes the security checking; and
    directing, by the system, the communication to a second location specified for communications that do not pass the security checking, when the return code indicates that the communication fails the security checking.

2. The non-transitory machine-readable medium of claim 1, further comprising determining a security preference of the first user.

3. The non-transitory machine-readable medium of claim 1, wherein the return code indicates that the communication passes the security checking when at least one of the plurality of security checks indicates a pass.

4. The non-transitory machine-readable medium of claim 1, wherein the communication includes an email.

5. The non-transitory machine-readable medium of claim 4, wherein at least one of the security checks includes verifying at least a portion of an email address of a sender of the email.

6. The non-transitory machine-readable medium of claim 5, wherein the at least a portion of the email address of the sender is verified by comparing the at least a portion of the email address to information in a white list.

7. A method, comprising:
    receiving, through a service of a system having a processor and memory, a communication destined to a first user of a plurality of users of the service;
    performing, by the system, securing checking of the communication by applying a plurality of security checks to the communication;
    receiving, from each of the security checks, a code indicative of a result of the security checks;
    determining a return code that summarizes the received codes and indicates whether the communication passes the security checking;
    delivering, through the service of the system, the communication to a first location that is a destination of the communication, when the return code indicates that the communication passes the security checking; and
    directing, by the system, the communication to a second location specified for communications that do not pass the security checking, when the return code indicates that the communication fails the security checking.

8. An apparatus, comprising:
    a hardware processor of a system; and
        one or more stored sequences of instructions which, when executed by the processor, cause the processor to carry out the steps of:
        receiving, through a service of the system having the processor and memory, a communication destined to a first user of a plurality of users of the service;
        performing, by the system, securing checking of the communication by applying a plurality of security checks to the communication;
        receiving, from each of the security checks, a code indicative of a result of the security check;
        determining a return code that summarizes the received codes and indicates whether the communication passes the security checking;
        delivering, through the service of the system, the communication to a first location that is a destination of the communication, when the return code indicates that the communication passes the security checking; and
        directing, by the system, the communication to a second location specified for communications that do not pass the security checking, when the return code indicates that the communication fails the security checking.

* * * * *

UNITED STATES PATENT AND TRADEMARK OFFICE
CERTIFICATE OF CORRECTION

| | | |
|---|---|---|
| PATENT NO. | : 9,059,981 B2 | Page 1 of 1 |
| APPLICATION NO. | : 13/797828 | |
| DATED | : June 16, 2015 | |
| INVENTOR(S) | : Michael P. Cadden et al. | |

It is certified that error appears in the above-identified patent and that said Letters Patent is hereby corrected as shown below:

In the Claims:
At column 15, claim number 1, line number 31; please replace "a memory" with --memory--;
At column 16, claim number 7, line number 17; please replace "a result of the security checks;" with --a result of the security check;--.

Signed and Sealed this
Twenty-sixth Day of January, 2016

Michelle K. Lee
*Director of the United States Patent and Trademark Office*